US012712832B2

(12) United States Patent
Zhu

(10) Patent No.: US 12,712,832 B2
(45) Date of Patent: Aug. 18, 2026

(54) METHOD AND APPARATUS, DEVICE, AND MEDIUM FOR CREATING MESSAGE CHANNEL

(71) Applicant: Lemon Inc., Grand Cayman (KY)

(72) Inventor: Qinghao Zhu, Beijing (CN)

(73) Assignee: Lemon Inc., Grand Cayman (KY)

( * ) Notice: Subject to any disclaimer, the term of this patent is extended or adjusted under 35 U.S.C. 154(b) by 58 days.

(21) Appl. No.: 18/999,400

(22) Filed: Dec. 23, 2024

(65) Prior Publication Data

US 2025/0219972 A1 Jul. 3, 2025

(30) Foreign Application Priority Data

Dec. 27, 2023 (CN) ........................ 202311833033.X

(51) Int. Cl.
*H04L 51/04* (2022.01)
*H04L 65/1069* (2022.01)
*H04L 67/141* (2022.01)

(52) U.S. Cl.
CPC .......... *H04L 51/04* (2013.01); *H04L 65/1069* (2013.01); *H04L 67/141* (2013.01)

(58) Field of Classification Search
CPC .... H04L 51/04; H04L 65/1069; H04L 67/141
See application file for complete search history.

(56) References Cited

U.S. PATENT DOCUMENTS 9,906,487 B2 * 2/2018 Maffeis .................. H04L 67/34
2012/0173610 A1 * 7/2012 Bleau ...................... H04L 67/55
709/203

OTHER PUBLICATIONS

Guangliang Yang et al. "Study and Mitigation of Origin Stripping Vulnerabilities in Hybrid-postMessage Enabled Mobile Applications", 2018 IEEE Symposium on Security and Privacy, 14 pages. (Year: 2018).*

* cited by examiner

*Primary Examiner* — G. C. Neurauter, Jr.
(74) *Attorney, Agent, or Firm* — Alleman Hall LLP

(57) ABSTRACT

The present invention relates to the field of computer technologies, and discloses methods and apparatuses for creating a message channel, a device, and a medium. In the methods provided in embodiments of the present application, a client performs a message channel creation operation, and transmits a communication port for the message channel and a page identifier to a web end.

20 Claims, 3 Drawing Sheets

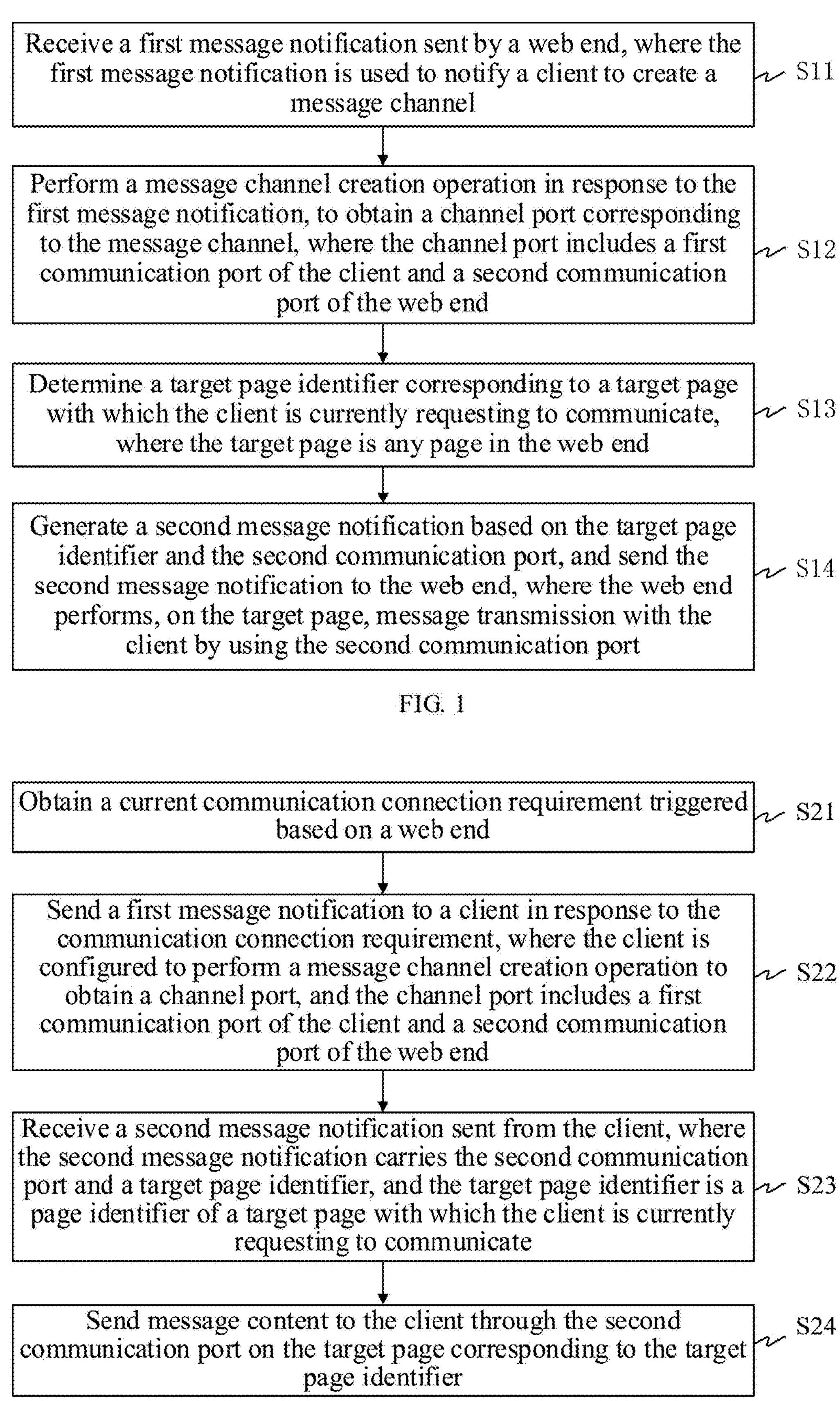
Receive a first message notification sent by a web end, where the first message notification is used to notify a client to create a message channel
S11
Perform a message channel creation operation in response to the first message notification, to obtain a channel port corresponding to the message channel, where the channel port includes a first communication port of the client and a second communication port of the web end
S12
Determine a target page identifier corresponding to a target page with which the client is currently requesting to communicate, where the target page is any page in the web end
S13
Generate a second message notification based on the target page identifier and the second communication port, and send the second message notification to the web end, where the web end performs, on the target page, message transmission with the client by using the second communication port
S14
FIG. 1
Obtain a current communication connection requirement triggered based on a web end
S21
Send a first message notification to a client in response to the communication connection requirement, where the client is configured to perform a message channel creation operation to obtain a channel port, and the channel port includes a first communication port of the client and a second communication port of the web end
S22
Receive a second message notification sent from the client, where the second message notification carries the second communication port and a target page identifier, and the target page identifier is a page identifier of a target page with which the client is currently requesting to communicate
S23
Send message content to the client through the second communication port on the target page corresponding to the target page identifier
S24
FIG. 2

METHOD AND APPARATUS, DEVICE, AND MEDIUM FOR CREATING MESSAGE CHANNEL

CROSS-REFERENCE TO RELATED APPLICATION(S)

This application claims priority to Chinese Application No. 202311833033.X filed Dec. 27, 2023, the disclosure of which is incorporated herein by reference in its entirety.

FIELD

The present invention relates to the field of computer technologies, and in particular, to a method, apparatus, a device, and a medium for creating a message channel.

BACKGROUND

At present, there are a number of JSBridge solutions, which are fundamentally implemented by using addJavaScriptInterface/loadUrl. In practical services, the current JSBridge solutions are problematic in terms of both performance and security. The main reasons are as follows.

SUMMARY

In view of this, embodiments of the present invention provide a method and an apparatus, a device, and a medium for creating a message channel, to address the problems that the current JSBridge solutions affect the performance of JSBridge due to low execution efficiency and fail to guarantee the security for calls.

According to a first aspect, an embodiment of the present invention provides a method for creating a message channel. The method includes:

receiving a first message notification sent by a web end, where the first message notification is used to notify a client to create a message channel;

performing a message channel creation operation in response to the first message notification, to obtain a channel port corresponding to the message channel, where the channel port includes a first communication port of the client and a second communication port of the web end;

determining a target page identifier corresponding to a target page with which the client is currently requesting to communicate, where the target page identifier is a page identifier that the client authenticates before creating the message channel; and generating a second message notification based on the target page identifier and the second communication port, and sending the second message notification to the web end, where the web end performs, on the target page, message transmission with the client by using the second communication port.

According to a second aspect, an embodiment of the present invention provides a method for creating a message channel. The method includes:

obtaining a current communication connection requirement triggered based on a web end;

sending a first message notification to a client in response to the communication connection requirement, where the client is configured to perform a message channel creation operation to obtain a channel port, and the channel port includes a first communication port of the client and a second communication port of the web end;

receiving a second message notification sent from the client, where the second message notification carries the second communication port and a target page identifier, where the target page identifier is a page identifier of a target page with which the client is currently requesting to communicate; and sending message content to the client through the second communication port on the target page corresponding to the target page identifier.

In the embodiment of the present application, receiving a second message notification sent from the client includes:

receiving the second message notification through a target main window, and extracting the target page identifier from the second message notification, where the target main window is a main window of the target page; and confirming receipt of the second message notification when a page identifier of the target main window is consistent with the target page identifier.

According to a third aspect, an embodiment of the present invention provides an apparatus for creating a message channel. The apparatus includes:

a first receiving module configured to receive a first message notification sent by a web end, where the first message notification is used to notify a client to create a message channel;

an execution module configured to perform a message channel creation operation in response to the first message notification, to obtain a channel port corresponding to the message channel, where the channel port includes a first communication port of the client and a second communication port of the web end;

a determination module configured to determine a target page identifier corresponding to a target page with which the client is currently requesting to communicate, where the target page identifier is a page identifier that the client authenticates before creating the message channel; and a first sending module configured to generate a second message notification based on the target page identifier and the second communication port, and send the second message notification to the web end, where the web end performs, on the target page, message transmission with the client by using the second communication port.

According to a fourth aspect, an embodiment of the present invention provides an apparatus for creating a message channel. The apparatus includes:

an obtaining module configured to obtain a current communication connection requirement triggered based on a web end;

a second sending module configured to send a first message notification to a client in response to the communication connection requirement, where the client is configured to perform a message channel creation operation to obtain a channel port, and the channel port includes a first communication port of the client and a second communication port of the web end;

a second receiving module configured to receive a second message notification sent from the client, where the second message notification carries the second communication port and a target page identifier, and the target page identifier is a page identifier of a target page with which the client is currently requesting to communicate; and a transmission module configured to send message content to the client through the second communication port on the target page corresponding to the target page identifier.

According to a fifth aspect, an embodiment of the present invention provides an electronic device. The electronic device includes: a memory and a processor communicatively connected to each other, where the memory stores computer instructions, and the processor executes the computer instructions to perform the method according to the first aspect or any one of the corresponding implementations thereof.

According to a sixth aspect, an embodiment of the present invention provides a computer-readable storage medium having stored thereon computer instructions, where the computer instructions are used to cause a computer to perform the method according to the first aspect or any of the corresponding implementations thereof.

BRIEF DESCRIPTION OF THE DRAWINGS

In order to more clearly describe the technical solutions in specific implementations of the present invention or in the prior art, the accompanying drawings required for describing the specific implementations or the prior art will be briefly described below. Apparently, the accompanying drawings in the description below show some of the implementations of the present invention, and those of ordinary skill in the art may still derive other accompanying drawings from these accompanying drawings without creative efforts.

FIG. 1 is a schematic flowchart of a method for creating a message channel according to some embodiments of the present invention;

FIG. 2 is a schematic flowchart of a method for creating a message channel according to some embodiments of the present invention;

DETAILED DESCRIPTION OF EMBODIMENTS

Figures 3, 4:
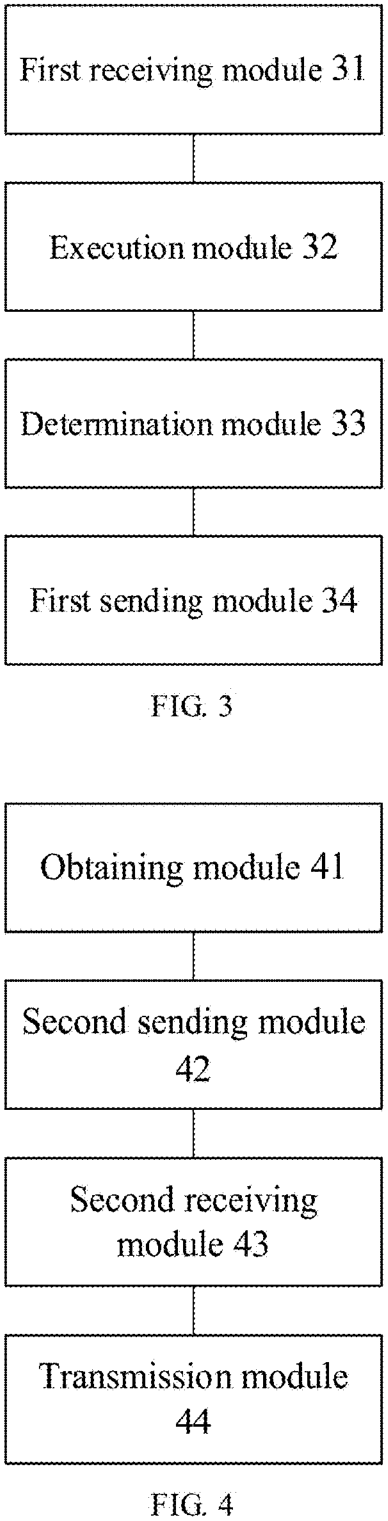
FIG. 3 is a block diagram of a structure of an apparatus for creating a message channel according to an embodiment of the present invention.
FIG. 4 is a block diagram of a structure of an apparatus for creating a message channel according to an embodiment of the present invention.

In order to make the objects, technical solutions and advantages of embodiments of the present invention clearer, the technical solutions in the embodiments of the present invention will be described clearly and completely below with reference to the accompanying drawings in the embodiments of the present invention. Obviously, the embodiments described are some of, rather than all of, the embodiments of the present invention. All other embodiments obtained by those skilled in the art based on the embodiments of the present invention without creative efforts shall fall within the scope of protection of the present invention.

According to the embodiments of the present invention, there are provided a method and an apparatus, a device, and a medium for creating a message channel. It should be noted that the steps shown in the flowcharts of the drawings may be performed in a computer system, such as a set of computer-executable instructions, and although a logical sequence is shown in the flowchart, the steps shown or described may be performed in different sequences from those herein in some cases.

The current JSBridge solutions require detection of a whitelist after reception of a call. However, a malicious attack may occur due to different call and detection times. For example, an attacker may bypass whitelist detection by modifying the whitelist before a JSBridge call. In addition, due to different call and detection times, the attacker may also find patterns from the whitelist by analyzing the content of the whitelist, to make a further attack.

Moreover, the current solutions require a main thread to handle URL verification on each call. This lowers execution efficiency of JSB. Specifically, when JSBridge is handling other tasks, logic for the client to handle URL verification needs to be performed on the main thread. This lowers execution efficiency of the JSB, ultimately affecting the performance.

In summary, the current JSBridge solutions affect the performance of JSBridge due to low execution efficiency and fail to guarantee the security for calls.

In an embodiment, there is provided a method for creating a message channel. The method is applicable to a mobile terminal, such as a mobile phone or a tablet computer. FIG. 1 is a flowchart of a method for creating a message channel according to an embodiment of the present invention. As shown in FIG. 1, the flow includes the following steps.

Step S11: Receive a first message notification sent by a web end, where the first message notification is used to notify a client to create a message channel.

The method provided in this embodiment of the present application is applied to a client, which may be referred to as a native end. The client is an application developed using a native programming language (such as Java, Objective-C, or Swift), which may run directly on a specific platform (such as Android or iOS) and is tightly coupled to an operating system and a device. Corresponding to the client is a web end (front end). The web end is an application developed using Web technologies (such as HTML, CSS, and JavaScript) that runs on a variety of platforms through browsers. The web end does not need to be compiled and constructed for specific operating systems and devices, and is cross-platform.

In an app development, the client is often combined with the web end to provide a better user experience and flexibility. The client is responsible for handling underlying operations and service logic and providing functions that are closely integrated with devices and systems, while the web end is responsible for constructing interfaces and implementing part of the service logic. The client and the web end communicate and interact with each other through JSBridge and other mechanisms.

In the embodiment of the present application, the web end may send the first message notification to the client according to its own communication connection requirement, where the first message notification is used to notify the client to create the message channel between the client and the web end. The communication connection requirement of the web end may include, but is not limited to, the following situations. The web end needs to transmit data to the client, such as sending data input or operated by a user, or transmitting page status information. The web end needs to monitor and receive an event triggered by the client, such as a device orientation change or a network status change. The web end may need to perform bidirectional communication with the client for real-time data updates, interoperability, and status synchronization.

Depending on specific service requirements, the web end can send the message notification to the client according to their own communication connection requirement, to request establishment of the message channel to meet the above communication connection requirement. The client may operate and create the message channel with the web end based on the received message notification, enabling communication between the client and the web end.

Step S12: Perform a message channel creation operation in response to the first message notification, to obtain a channel port corresponding to the message channel, where the channel port includes a first communication port of the client and a second communication port of the web end.

In the embodiment of the present application, after receiving the first message notification, the client enters the message channel creation flow based on the first message notification, which specifically involves: calling a main thread to create the message channel according to a preset method, to obtain a port array returned by the preset method; parsing the port array to obtain the first communication port and the second communication port; and constructing the channel port with the first communication port and the second communication port.

Specifically, the main thread creates a message channel by calling a webview.createWebMessageChannel( ) method, and assigns the returned port array (WebMessagePort array) to a channel variable. In the port array, the first element channel[0] represents a communication port held by the client, denoted as the first communication port, and the second element channel[1] represents a communication port held by the web end, denoted as the second communication port. By using the two communication ports, bidirectional message communication between the client and the web end can be implemented.

In addition, after the port array is obtained, the main thread also needs to configure corresponding message processing logic based on the first communication port, where the message processing logic is used to process a message sent by the web end. For example, the message processing logic may be used to call a native function. If the message is used to call the native function, the corresponding native function can be called based on the received message content. The message processing logic may also be used to enable bidirectional communication, which may be performing corresponding processing and replies based on the received message content.

As an example, a Handler that executes in the main thread is created, and the following operations are performed in a task corresponding to the Handler.

A Handler that executes in the main thread is created, and the following operations are performed in a task corresponding to the Handler.

(1) Set a WebMessageCallback object for mJSBMessagePort, to process the received message. The mJSBMessagePort is a message pipeline object, and WebMessageCallback may define the processing logic of when the message is received. WebMessageCallback is a callback interface.

(2) Set processing logic for the received message in a message pipeline, that is, calling BridgeHandler.handle (message.getData( ), mPermission) in an onMessage method to process the received message.

In the embodiment of the present application, before calling a main thread to create the message channel according to a preset method, to obtain a port array returned by the preset method, the method further includes: obtaining a current page identifier list at the web end, where the page identifier list includes at least one accessible page identifier; obtaining permission information corresponding to the page identifier; and triggering a message channel creation mechanism to take effect when the permission information is verified, where the message channel creation mechanism is used to call the main thread to create the message channel according to the preset method.

Specifically, the web end may share the page identifier list with the client by a message sharing mechanism. The client needs to perform URL permission verification on the page identifier in the page identifier list at the web end before calling a m Web View.createWebMessageChannel( ) method. This is to ensure that only authorized JavaScript code may access functions of the client, thus ensuring the security of the application. This provides a basis for subsequent permission verification by dynamically issuing the permission of a configured url in Android, for example: issuing example.com. The client receives and saves a configuration item "example.com". Therefore, it is determined that the domain name example.com is secure and has access to JSBridge. Subsequently, when the client verifies the page identifier from the web end, the client checks whether the URL corresponding to the identifier is in the configuration item, i.e., whether it has access to JSBridge. If the URL is in the configuration item, it indicates that the page is considered secure and has access to JSBridge, and subsequent operations may be proceeded.

It should be noted that during the message channel creation process, the client first performs permission verification on the page identifier for the web end, and then performs the message channel creation flow after the verification succeeds, which may ensure that the message channel will only be called by the page corresponding to the page identifier for which the permission has been verified throughout the life cycle of the message channel. Therefore, the link only needs to be authenticated once when the message channel is created, and subsequent messages will be verified directly using an authentication result obtained at initialization. Therefore, the method provided in the embodiment of the present application requires only one authentication, which improves the call performance of the message channel. In addition, since an authentication process in an existing solution is performed only on the main thread, the method provided in the embodiment of the present application eliminates the need to perform the authentication process on the main thread, which lowers the burden on the main thread to a certain extent.

Step S13: Determine a target page identifier corresponding to a target page with which the client is currently requesting to communicate, where the target page is any page in the web end, and the target page identifier is a page identifier that the client authenticates before creating the message channel.

In the embodiment of the present application, the target page may be understood as a page with which the client requests to communicate. When the client needs to communicate with the web end, the client may specify a target page identifier (uniform resource locator, URL) and then communicate with the web end through the URL. This URL is the page identifier that the client authenticates before creating the message channel.

It should be noted that the client may use the specified URL to determine which page to communicate with. This may ensure the accuracy of the target page for communication, and enhances the security and effectiveness of communication.

Step S14: Generate a second message notification based on the target page identifier and the second communication port, and send the second message notification to the web end, where the web end performs, on the target page, message transmission with the client by using the second communication port.

In the embodiment of the present application, the client generates the second message notification based on the target page identifier and the second communication port, and sends the second message notification to a target main window (MainFrame) of the target page through the first communication port. After the target main window verifies the target page identifier in the second message notification, it is confirmed that based on the second message notification, the web end can obtain the second communication port for message transmission with the client, and the web end can transmit, on the target page, messages to the client by using the second communication port. This enables bidirectional communication between the client and the web end.

According to the methods provided in the embodiments of the present application, the client performs the message channel creation operation, and transmits a communication port for the message channel and the page identifier to the web end, such that the web end can communicate with the client based on the communication port transmitted by the client, thereby enabling bidirectional communication between the client and the web end, and improving the efficiency of communication between the client and the web end. In addition, the client completes the authentication of the page identifier before the creation of the message channel, such that the message channel can only communicate with the page for the authenticated page identifier, thus ensuring security, and there is also no need for further authentication on each subsequent call, which improves the performance of the message channel.

In the embodiment of the present application, the method further includes the following steps A1 to A3.

Step A1: Call a target thread to monitor, through the first communication port, message content from the web end, where the target thread is any thread, other than a main thread, in the client.

In the embodiment of the present application, the target thread may be a thread other than the main thread. In the embodiment of the present application, a message pipeline creation operation is performed on the main thread, and messages at the web end are monitored by using other threads, which can significantly lower the burden on the main thread and thus improve the message processing efficiency.

Step A2: Process the message content according to preset message processing logic, to obtain a processing result, where the preset message processing logic is configured at the client during the message channel creation process.

In the embodiment of the present application, the message content may include various types of service data. Some examples of the service data are as follows. Order information: order ID, commodity list, total price, etc. Payment information: payment amount, payment status, etc. Processing the message content according to preset message processing logic, to obtain a processing result may be as follows. For the order information: after the target thread processes the order information, information such as the status, the commodity list, and the total price of the order can be obtained. The information may be used to update an order details page to present to the user the current order status and commodity details. Alternatively, for the payment information: after the target thread processes the payment information, the payment status (such as a payment success or a payment failure) can be obtained. Depending on the payment status, the order status may be updated, a prompt message indicating the payment success or failure may be sent to the user, and subsequent service logic, such as shipping and after-sales, may be triggered.

Step A3: Send the processing result to the target page at the web end through the first communication port.

In the embodiment of the present application, at the client side, receiving and sending messages by using threads other than the main thread can bring the following benefits.

(1) Reduced time spent on a message channel call: Usually, the main thread is busy, and tasks that need to be performed on the main thread often need to be queued for control of the main thread, which may result in some performance overheads. The message channel call is executed on another thread, which can avoid blocking on the main thread and thus reduce the time spent on the call.

(2) Lowered burden on the main thread: The main thread is usually responsible for UI rendering, user interaction, and other tasks. If the message channel call blocks the main thread, the performance of the main thread may be affected, resulting in problems such as a stuck interface and a slow response. The message channel call is executed on another thread, which can lower the burden on the main thread.

(3) Improved performance of the client: The performance at the client side can be improved by reducing the time spent on the message channel call and lowering the burden on the main thread. In complex service scenarios, the message channel call may be time-consuming. Therefore, the message channel call is executed on another thread, which may avoid blocking on the main thread, thereby improving performance.

It should be noted that the client can send, on other threads, messages to the web end through a port.postMessage( ) method, and the web end can receive, by setting port.onmessage event monitoring, the messages sent by the client. Therefore, by creating a WebMessagePort port array, with one of the ports being transmitted to the client and the other one of the ports being transmitted to the web end, message communication between the client and the web end can be enabled.

As an example, a thread named "WorkerThread" in the client is selected as the target thread. The thread "WorkerThread" is a background thread, which is responsible for processing messages from the web end. A communication port named "Port1" is created for communication with the web end.

At the web end, the user inputs two numbers in a sheet: 2 and 3, and then clicks on a "Calculate" button. The thread "WorkerThread" in the client monitors the messages from the web end through the communication port "Port1". The client receives a message from the web end, the content thereof being "Calculate 2+3".

According to the preset message processing logic, the client parses the message content and performs a corresponding calculation operation. In this way, based on an operator "+" in the message content, the client adds 2 and 3 to get 5 as a processing result. The processing result 5 is sent back to the target page of the web end through the communication port "Port1". Finally, the web end can obtain the processing result from the client, and present the calculation result as 5 on the page.

FIG. 2 is a flowchart of a method for creating a message channel according to an embodiment of the present invention. As shown in FIG. 2, the flow includes the following steps.

Step S21: Obtain a current communication connection requirement triggered based on a web end.

The method provided in the embodiment of the present application is applied to the web end. The web end is an application developed using Web technologies (such as HTML, CSS, and JavaScript) that runs on a variety of platforms through browsers. The communication connection requirement of the web end may include, but is not limited to, the following situations. The web end needs to transmit data to the client, such as sending data input or operated by a user, or transmitting page status information. The web end needs to monitor and receive an event triggered by the client, such as a device orientation change or a network status change. The web end may need to perform bidirectional communication with the client for real-time data updates, interoperability, and status synchronization.

In the embodiment of the present application, the web end calls a JavaScript interface provided by the client to send a first message notification. If the client provides the JavaScript interface for the web end to call, the interface can be directly called to send the message notification to the client, which may be specifically implemented according to an interface document provided by the client.

Step S22: Send a first message notification to the client in response to the communication connection requirement, where the client is configured to perform a message channel creation operation to obtain a channel port, and the channel port includes a first communication port of the client and a second communication port of the web end.

In the embodiment of the present application, the web end may send the first message notification to the client according to its own communication connection requirement, where the first message notification is used to notify the client to create the message channel between the client and the web end.

Step S23: Receive a second message notification sent from the client, where the second message notification carries the second communication port and a target page identifier, and the target page identifier is a page identifier of a target page with which the client is currently requesting to communicate.

In the embodiment of the present application, receiving a second message notification sent from the client includes: receiving the second message notification through a target main window, and extracting the target page identifier from the second message notification, where the target main window is a main window of the target page; and confirming receipt of the second message notification when a page identifier of the target main window is consistent with the target page identifier.

In the embodiment of the present application, the target main window is MainFrame. MainFrame is the top-most window or frame window on a Web page. MainFrame is a container that contains Web-end code, and MainFrame is the top-most window on the Web page that contains JS code. The JS code is executed in MainFrame to implement operations of interacting with the page, processing an event, modifying DOM, etc. The web end can operate and access the content of the MainFrame. For example, JavaScript may be used to modify DOM elements in MainFrame, send a request, process the event, etc.

In summary, MainFrame is the name of the top window (or frame) that contains the JS-end code. The Web-end code is executed in MainFrame, and enables interaction with the page and functionality by operating and accessing the content of the MainFrame.

Step S24: Send message content to the client through the second communication port on the target page corresponding to the target page identifier.

In the embodiment of the present application, after obtaining the second communication port, the web end sends the message content to the client through the second communication port on the target page. When the web end sends a message to the client through the second communication port, the message content may include various types of service data. Some examples of the service data are as follows. Order information: order ID, commodity list, total price, etc. Payment information: payment amount, payment status, etc. Login credential: token, user name password, etc. Query request: request to obtain user data, commodity list, etc. Update request: update user information, modify an order, etc.

It should be noted that for the web end, sending the message content is a non-blocking operation, because the process of sending the message content does not affect other tasks on the JS thread of the web end. When a message is sent, the JS thread submits a message sending request to an underlying communication module and then proceeds to perform other tasks, such as data processing and interface rendering. During this process, the JS thread is not blocked. Therefore, the message sending operation does not affect the performance of the entire JS side. The advantage of such a non-blocking operation is that it allows the JS side to send a message while processing other tasks, thereby improving the overall performance. Moreover, when handling a complex scenario, the non-blocking operation can effectively avoid a performance bottleneck caused by waiting for the message to be sent. In summary, for the web end, sending the message is a non-blocking operation, which does not block the JS thread, thereby improving the performance of the web end to a certain extent.

In this embodiment, there is further provided an apparatus for creating a message channel. The apparatus is used to implement the above embodiments and preferred implementations, and the content that has already been described will not be repeated herein. As used below, the term "module" may be a combination of software and/or hardware that implements a predetermined function. Although the apparatus described in the following embodiment is preferably implemented in software, it is also possible and contemplated that the apparatus is implemented in hardware or a combination of software and hardware.

The embodiment provides an apparatus for creating a message channel. As shown in FIG. 3, the apparatus includes:

a first receiving module 31 configured to receive a first message notification sent by a web end, where the first message notification is used to notify a client to create a message channel;

an execution module 32 configured to perform a message channel creation operation in response to the first message notification, to obtain a channel port corresponding to the message channel, where the channel port includes a first communication port of the client and a second communication port of the web end;

a determination module 33 configured to determine a target page identifier corresponding to a target page with which the client is currently requesting to communicate; and a first sending module 34 configured to generate a second message notification based on the target page identifier and the second communication port, and send the second message notification to the web end, where the web end performs, on the target page, message transmission with the client by using the second communication port.

In the embodiment of the present application, the execution module 32 is configured to: call a main thread to create the message channel according to a preset method, to obtain a port array returned by the preset method; parse the port array to obtain the first communication port and the second communication port; and construct the channel port by using the first communication port and the second communication port.

In the embodiment of the present application, the apparatus further includes an authentication module configured to: obtain a current page identifier list at the web end, where the page identifier list includes at least one accessible page identifier; obtain permission information corresponding to the page identifier; and trigger a message channel creation mechanism to take effect when the permission information is verified, where the message channel creation mechanism is used to call the main thread to create the message channel according to the preset method.

In the embodiment of the present application, the apparatus further includes a processing module configured to: call a target thread to monitor, through the first communication port, message content from the web end, where the target thread is any thread, other than a main thread, in the client; process the message content according to preset message processing logic, to obtain a processing result, where the preset message processing logic is configured at the client during the message channel creation process; and send the processing result to the target page at the web end through the first communication port.

In this embodiment, there is further provided an apparatus for creating a message channel. The apparatus is used to implement the above embodiments and preferred implementations, and the content that has already been described will not be repeated herein. As used below, the term "module" may be a combination of software and/or hardware that implements a predetermined function. Although the apparatus described in the following embodiment is preferably implemented in software, it is also possible and contemplated that the apparatus is implemented in hardware or a combination of software and hardware.

The embodiment provides an apparatus for creating a message channel. As shown in FIG. 4, the apparatus includes:

- an obtaining module 41 configured to obtain a current communication connection requirement triggered based on a web end;
- a second sending module 42 configured to send a first message notification to a client in response to the communication connection requirement, where the client is configured to perform a message channel creation operation to obtain a channel port, and the channel port includes a first communication port of the client and a second communication port of the web end;
- a second receiving module 43 configured to receive a second message notification sent from the client, where the second message notification carries the second communication port and a target page identifier, and the target page identifier is a page identifier of a target page with which the client is currently requesting to communicate; and
- a transmission module 44 configured to send message content to the client through the second communication port on the target page corresponding to the target page identifier.

Figure 5:
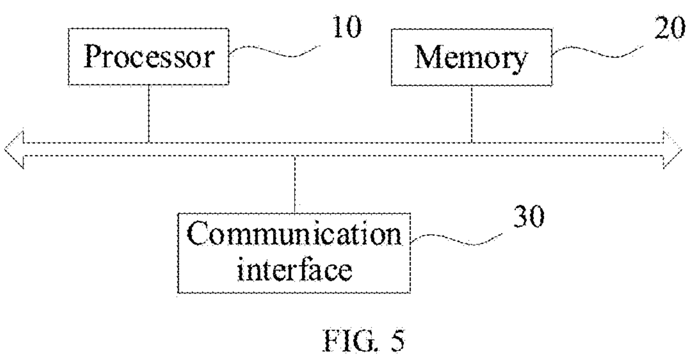
FIG. 5 is a schematic diagram of a hardware structure of an electronic device according to an embodiment of the present invention.

With reference to FIG. 5, FIG. 5 is a schematic diagram of a structure of an electronic device according to an optional embodiment of the present invention. As shown in FIG. 5, the electronic device includes: one or more processors 10, one or more memories 20, and interfaces for connecting components, including a high-speed interface and a low-speed interface. The components are communicatively connected to each other via different buses, and can be mounted on a common motherboard or otherwise as desired. The processor may process instructions executed in the electronic device, including instructions stored in or on the memory to display graphical information of a GUI on an external input/output apparatus (such as a display device coupled to the interface). In some optional implementations, if required, a plurality of processors and/or a plurality of buses may be used together with a plurality of memories. Likewise, a plurality of electronic devices may be connected, each providing some of the necessary operations (e.g., as a server array, a set of blade servers, or a multi-processor system).

The processor 10 may be a central processor, a network processor, or a combination thereof. The processor 10 may further include a hardware chip. The hardware chip may be an application-specific integrated circuit, a programmable logic device, or a combination thereof. The programmable logic device may be a complex programmable logic device, a field-programmable gate array, generic array logic, or any combination thereof.

The memory 20 stores instructions executable by at least one processor 10 to cause the at least one processor 10 to perform the methods shown in the above embodiments.

The memory 20 may include a program storage area and a data storage area. The program storage area may store an operating system, and an application required by at least one function. The data storage area may store data created from the use of the electronic device represented on an applet landing page, etc. In addition, the memory 20 may include a high-speed random access memory, and may further include a non-transitory memory, such as at least one magnetic disk storage device, a flash memory device, or other non-transitory solid-state storage devices. In some optional implementations, the memory 20 optionally includes memories remotely provided relative to the processor 10. The remote memories may be connected to the electronic device over a network. Instances of the network include, but are not limited to, the Internet, intranets, local area networks, mobile communication networks, and combinations thereof.

The memory 20 may include a volatile memory, such as a random access memory. The memory may also include a non-volatile memory, such as a flash memory, a hard disk drive, or a solid-state hard disk. The memory 20 may also include a combination of the above types of memories.

An input apparatus 30 can receive entered numeric or character information and generate a key signal input related to a user setting and function control of the electronic device, such as a touch screen, a keypad, a mouse, a trackpad, a touchpad, a pointing stick, one or more mouse buttons, a trackball, or a joystick. An output apparatus 40 may include a display device, an auxiliary lighting apparatus (e.g., an LED), a tactile feedback apparatus (e.g., a vibration motor), and the like. The display device includes, but is not limited to, a liquid crystal display, a light-emitting diode, a display, and a plasma display. In some optional implementations, the display device may be a touch screen.

The electronic device further includes a communication interface 30 for the electronic device to communicate with other devices or communication networks.

An embodiment of the present invention further provides a computer-readable storage medium. The above methods according to the embodiments of the present invention may be implemented in hardware or firmware, or implemented as being recordable on the storage medium, or implemented as computer code that is downloaded over a network and that is originally stored in a remote storage medium or a non-transitory machine-readable storage medium and is to be stored in a local storage medium, such that the methods described herein may be processed by such software stored on the storage medium using a general-purpose computer, a dedicated processor, or programmable or dedicated hardware. The storage medium may be a magnetic disk, an optical disc, a read-only storage memory, a random storage memory, a flash memory, a hard disk drive or a solid-state drive, etc. Further, the storage medium may also include a combination of the above types of memories. It can be understood that a computer, a processor, a microprocessor controller, or programmable hardware includes a storage component that can store or receive software or computer code. When the software or computer code is accessed and executed by the computer, the processor, or the hardware, the methods shown in the above embodiments are implemented.

Although the embodiments of the present invention are described with reference to the accompanying drawings, those skilled in the art would provide various modifications and variations without departing from the spirit and scope of the present invention, and such modifications and variations shall all fall within the scope defined by the appended claims.

The invention claimed is:

1. A method for creating a message channel, the method comprising:

receiving a first message notification sent by a web end, wherein the first message notification is used to notify a client to create a message channel;

performing a message channel creation operation in response to the first message notification, to obtain a channel port corresponding to the message channel, wherein the channel port comprises a first communication port of the client and a second communication port of the web end;

determining a target page identifier corresponding to a target page with which the client is currently requesting to communicate, wherein the target page identifier is a page identifier that the client authenticates before creating the message channel; and generating a second message notification based on the target page identifier and the second communication port, and sending the second message notification to the web end, wherein the web end performs, on the target page, message transmission with the client by using the second communication port.

2. The method according to claim 1, wherein performing a message channel creation operation to obtain a channel port corresponding to the message channel comprises:

calling a main thread to create the message channel according to a preset method, to obtain a port array returned by the preset method;

parsing the port array to obtain the first communication port and the second communication port; and constructing the channel port with the first communication port and the second communication port.

3. The method according to claim 2, wherein before calling a main thread to create the message channel according to a preset method, to obtain a port array returned by the preset method, the method further comprises:

obtaining a current page identifier list at the web end, wherein the page identifier list comprises at least one accessible page identifier;

obtaining permission information corresponding to the page identifier; and triggering a message channel creation mechanism to take effect in response to the permission information being verified, wherein the message channel creation mechanism is used to call the main thread to create the message channel according to the preset method.

4. The method according to claim 1, wherein the method further comprises:

calling a target thread to monitor, through the first communication port, message content from the web end, wherein the target thread is any thread, other than a main thread, in the client;

processing the message content according to preset message processing logic, to obtain a processing result, wherein the preset message processing logic is configured at the client during the message channel creation process; and sending the processing result to the target page at the web end through the first communication port.

5. The method according to claim 4, further comprises:

configuring the preset message processing logic based on the first communication port, wherein the preset message processing logic is used to process a message sent by the web end.

6. The method according to claim 1, wherein the client handles underlying operations and service logic and providing functions that are integrated with devices and systems.

7. The method according to claim 5, wherein the web end constructs interfaces and implements part of the service logic, and wherein the client communicates and interacts with the web end through JSBridge.

8. The method according to claim 5, wherein the port array comprises the first element channel representing a communication port held by the client, and the second element channel representing a communication port held by the web end.

9. The method according to claim 8, wherein the preset message processing logic is further used to call a native function or enable bidirectional communication.

10. A method for creating a message channel, the method comprising:

obtaining a current communication connection requirement triggered based on a web end;

sending a first message notification to a client in response to the communication connection requirement, wherein the client is configured to perform a message channel creation operation to obtain a channel port, wherein the channel port comprises a first communication port of the client and a second communication port of the web end;

receiving a second message notification sent from the client, wherein the second message notification carries the second communication port and a target page identifier, wherein the target page identifier is a page identifier of a target page with which the client is currently requesting to communicate; and sending message content to the client through the second communication port on the target page corresponding to the target page identifier.

11. The method according to claim 10, wherein the receiving a second message notification sent from the client comprises:

receiving the second message notification through a target main window, and extracting the target page identifier from the second message notification, wherein the target main window is a main window of the target page; and confirming receipt of the second message notification in response to a page identifier of the target main window being consistent with the target page identifier.

12. The method according to claim 10, wherein the communication connection requirement of the web end at least includes:

the web end sends data input or operated by a user;

the web end transmits page status information;

the web end monitors and receives an event triggered by the client; or the web end performs bidirectional communication with the client.

13. A non-transitory computer-readable storage medium, having stored thereon computer instructions, wherein the computer instructions are used to cause a computer to:

receive a first message notification sent by a web end, wherein the first message notification is used to notify a client to create a message channel;

perform a message channel creation operation in response to the first message notification, to obtain a channel port corresponding to the message channel, wherein the channel port comprises a first communication port of the client and a second communication port of the web end;

determine a target page identifier corresponding to a target page with which the client is currently requesting to communicate, wherein the target page identifier is a page identifier that the client authenticates before creating the message channel; and generate a second message notification based on the target page identifier and the second communication port, and sending the second message notification to the web end, wherein the web end performs, on the target page, message transmission with the client by using the second communication port.

14. The medium according to claim 13, wherein the computer instructions causing the computer to perform a message channel creation operation to obtain a channel port corresponding to the message channel comprise computer instructions causing the computer to:

call a main thread to create the message channel according to a preset method, to obtain a port array returned by the preset method;

parse the port array to obtain the first communication port and the second communication port; and construct the channel port with the first communication port and the second communication port.

15. The medium according to claim 14, wherein before calling a main thread to create the message channel according to a preset method, to obtain a port array returned by the preset method, the computer instructions further comprise computer instructions causing the computer to:

obtain a current page identifier list at the web end, wherein the page identifier list comprises at least one accessible page identifier;

obtain permission information corresponding to the page identifier; and trigger a message channel creation mechanism to take effect in response to the permission information being verified, wherein the message channel creation mechanism is used to call the main thread to create the message channel according to the preset method.

16. The medium according to claim 13, wherein the computer instructions further comprise computer instructions causing the computer to:

call a target thread to monitor, through the first communication port, message content from the web end, wherein the target thread is any thread, other than a main thread, in the client;

process the message content according to preset message processing logic, to obtain a processing result, wherein the preset message processing logic is configured at the client during the message channel creation process; and send the processing result to the target page at the web end through the first communication port.

17. The method according to claim 16, the computer instructions further comprise computer instructions causing the computer to:

configure the preset message processing logic based on the first communication port, wherein the preset message processing logic is used to process a message sent by the web end.

18. The medium according to claim 13, wherein the client handles underlying operations and service logic and provides functions that are integrated with devices and systems.

19. The medium according to claim 14, wherein the web end constructs interfaces and implements part of the service logic, and wherein the client communicates and interacts with the web end through JSBridge.

20. The medium according to claim 14, wherein the port array comprises the first element channel representing a communication port held by the client, and the second element channel representing a communication port held by the web end.

* * * * *